June 4, 1935.  W. McCARTHY ET AL  2,003,718
FRONT WHEEL DRIVE
Filed May 2, 1934   2 Sheets-Sheet 1
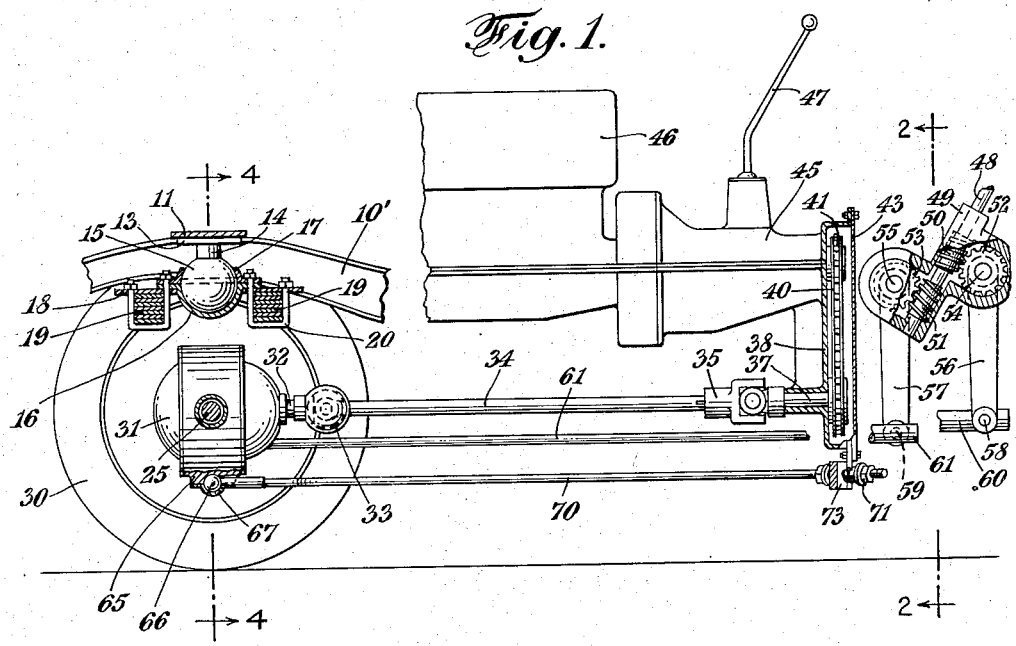
Fig. 1.
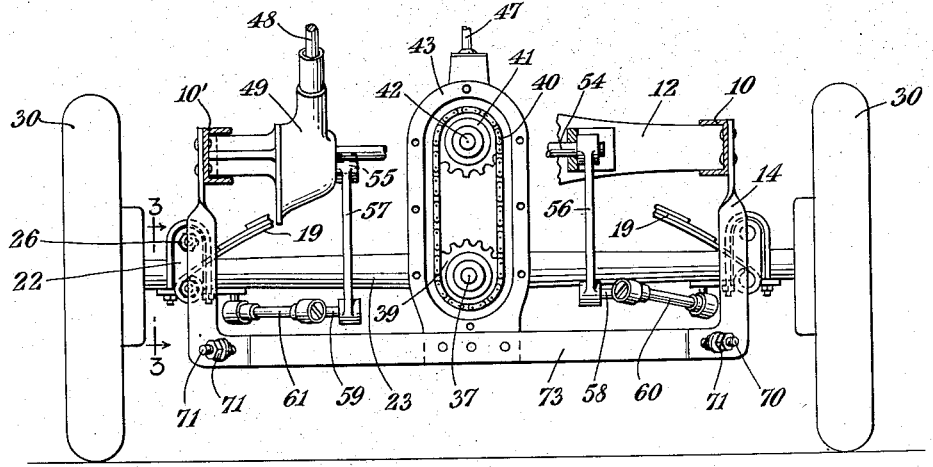
Fig. 2.
Fig. 3.
INVENTORS
William McCarthy.
George Wolff.
BY Warren E. Willis.
their ATTORNEY

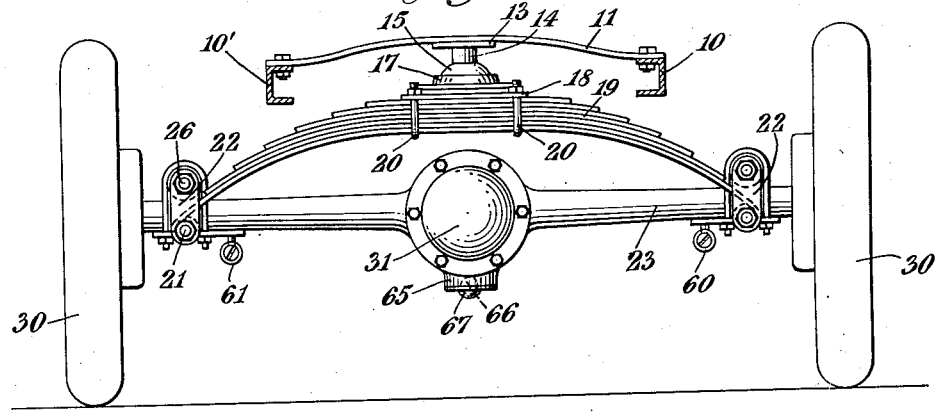
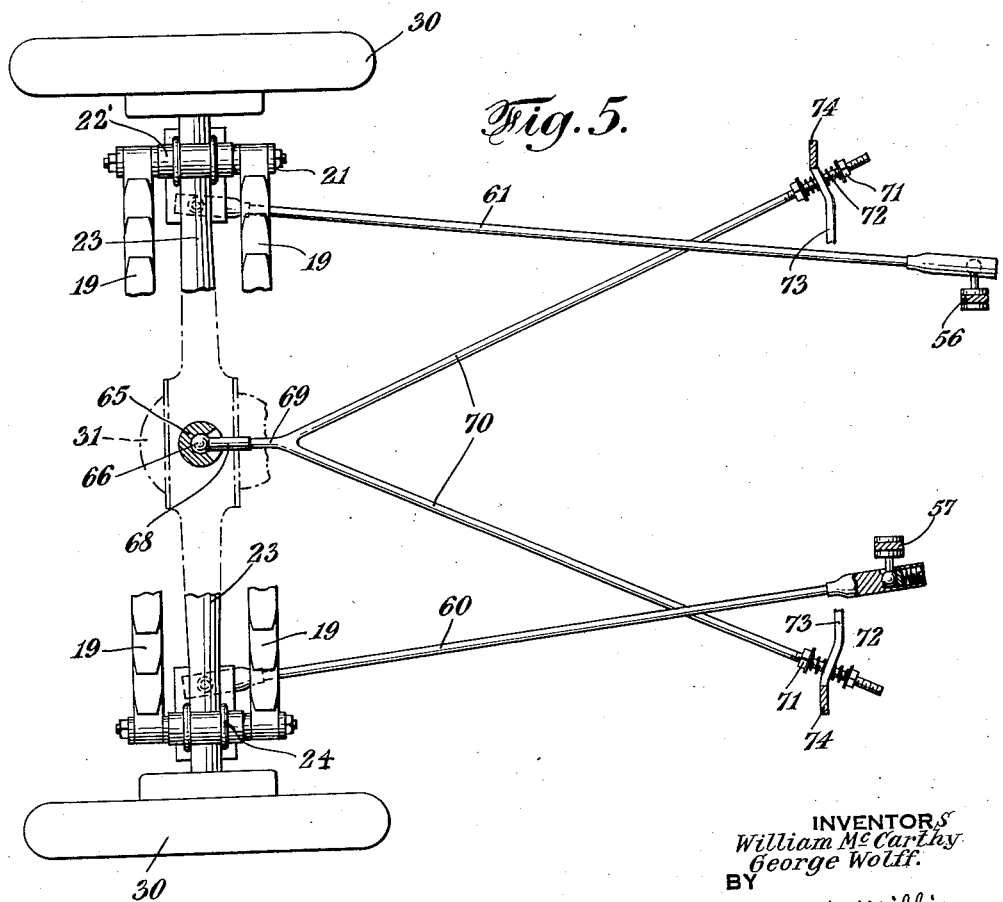

Patented June 4, 1935

2,003,718

UNITED STATES PATENT OFFICE 2,003,718

FRONT WHEEL DRIVE

William McCarthy and George Wolff, Clifton, N. J.

Application May 2, 1934, Serial No. 723,500

3 Claims. (Cl. 180—42)

This invention relates to dirigible road vehicles, of the automobile type, and more particularly, to such as have their driving power transmitted from the motor to the front wheels, the rear wheels running free upon their axle.

One of the objects of the invention is to provide a front axle on which the front wheels are rigidly mounted at its ends, the axle being pivoted centrally of its length in the manner of a ball and socket support, and provided with steering means controlled by the usual steering wheel.

A further feature is in the provision of a novel and efficient transmission system, whereby the energy of the motor is conducted to the front axle, irrespective of its angular position, relative to the body of the vehicle.

Another purpose is to produce a form of direction control, applied near the ends of the axle, adjacent the wheels, thus rendering the turning movement uniform, easy and without strain; the usual type of steering wheel is employed.

Another aim is to provide a three point support for the body in which swaying is prevented and permit the front wheels normally to be in direct alinement with the rear wheels.

These and other important purposes which will later appear, are accomplished by the novel construction, combination and arrangement of parts hereinafter described and illustrated in the accompanying drawings, constituting a material component of this disclosure, and in which:—

Figure 1 is a partial longitudinal sectional view of an embodiment of the invention, indicating its application.

Figure 2 is a transverse sectional view taken on line 2—2 of Figure 1.

Figure 3 is a fragmentary sectional view taken on line 3—3 of Figure 2.

Figure 4 is a transverse sectional view taken on line 4—4 of Figure 1.

Figure 5 is a plan view of the mechanism, parts being broken away and others in broken lines to show the construction.

Referring in greater detail to the drawings, the chassis of the vehicle is indicated as being composed of side beams 10—10', connected at intervals by cross-pieces 11—12, the foremost of which 11, rests at its center upon a support 13, connected by a stem 14, with a spherical ball 15, resting in a seat 16, and held movably therein by a cap 17.

The seat 16 is supported by a plate 18 extending longitudinally of the structure, this plate resting upon a pair of spaced semi-elliptic springs 19 held by clevises 20, the inner limbs of which act as bolts for the cap 17, to secure the structure firmly in place.

These springs are supported at their ends on bolts 21 or the like, mounted in blocks 22 secured to the axle casing 23, and held by other clevis bolts 24; the axle 25 passes freely through the casing 23, while in the upper part of the blocks 22, which are secured to the axle casing, adjacent the front wheels 30, are bolts 26 passing through spacing blocks 22'.

The axle casing 23 is preferably tapering increasingly from its ends to a differential housing 31, the driving gear of which (not shown) is secured to a stub shaft 32 extending rearwardly and terminating in one of the elements of a universal joint 33.

The other element of the universal joint 33 is engaged with a drive shaft 34 having at its opposite, rearwardly extending end, another universal joint element 35, connecting with a mating element on a stub shaft 37, mounted in a bearing 38, and having on its outer rear end, a sprocket 39 driven by a chain 40, trained over a similar sprocket 41, fixed to the motor transmission shaft, these several drive gear elements being enclosed within the bracket casing 38 by a removable cover plate 43.

It will be understood that any other mechanical equivalent may be substituted for the sprocket and chain drive.

The transmission shaft housed in the mechanism casing, 45 extends from the motor 46 and is provided with a gear shift lever 47 by which various speeds and a reverse direction may be obtained in the usual manner.

The steering wheel (not shown) is arranged as usual on the upper end of the steering wheel shaft 48, shown as mounted at its lower end in bracket 49, and has secured on its lower portion two left hand worms, respectively 50—51.

These worms actuate worm wheels 52—53 mounted upon shafts 54—55 journalled on opposite sides of the shaft 48 in the lower portion of the bracket 49 so as to be enclosed therewithin.

Secured to the shafts 54—55 are lever arms 56—57, normally pendant, and attached at their lower ends by well known types of spring tensioned ball joints 58—59, to rods 60—61, which are in turn, connected to the axle bearing 23, closely adjacent the spring connections.

Thus it will be apparent that upon turning the steering wheel in the usual manner, the rods 60—61 will be moved in opposite directions and that such movement will be transmitted directly to the front axle and its attached parts, the axle casing pivoting at its center at the differential housing 31.

At the bottom of this housing is a boss 65 having a ball seat in its under face to receive a ball 66 held in place by a cap 67, the ball being provided with a stem 68 connecting with the terminal element 69 of a pair of divergently forked stay rods 70, threaded on their outer portions to receive nuts 74 used to compress pairs of opposed encircling springs 72 arranged on opposite sides of a cross bar 73 arranged transversely of the chassis and having raised arms 79 rigidly secured to the side frame members 10—10'.

From the foregoing, it will be seen that the rods 70 act to retain the differential housing in its position and also to transmit a portion of the draft to the chassis.

The foregoing disclosure is to be regarded as descriptive and illustrative only, and not as restrictive or limitative of the invention, of which obviously an embodiment may be constructed including modifications without departing from the general scope herein indicated and denoted in the appended claims.

Having thus described the invention, what is claimed as new and desire to secure by Letters Patent, is:—

1. In a front drive for motor driven dirigible vehicles, an axle casing having road wheels secured at its ends, said casing enclosing wheel driving shafts, a differential casing integrally formed at the center of said casing and having drive elements therein, means for transmitting power from the vehicle motor to said differential mechanism, a pair of spaced cambered springs supported on blocks on said axle casing, a platform connecting said springs at their centers, said platform supporting a ball and socket, means carried by the ball and socket to support the forward end of the vehicle chassis, said support permitting universal movement between the chassis and the axle, and a stay rod having divergent arms slidably connected with the opposite sides of the vehicle chassis and connected at its other end to the axle by a universal joint.

2. In a front wheel drive for motor driven dirigible vehicle, an axle having road wheels at its outer ends, a casing enclosing said axle, a differential housing integrally formed at the center of said casing and having drive elements therein, means for transmitting power from the vehicle motor to said differential mechanism, a pair of spaced cambered springs attached at their ends to said axle casing, a platform connecting said springs at their centers, a universal joint supported by said platform, means carried by said universal joint to support the forward end of the vehicle chassis, said joint permitting universal movement between the chassis and the axle, a stay rod having divergent arms slidably connected with the opposite side elements of the vehicle chassis and connected at its convergent end by a universal joint to said differential housing, and means for adjusting the operative length of said arms.

3. In a front wheel drive for motor driven dirigible vehicle, an axle having road wheels at its outer ends, a casing enclosing said axle, a differential housing integrally formed at the center of said casing and having drive elements therein, means for transmitting power from the vehicle motor to said differential mechanism, a pair of spaced cambered springs attached at their ends to said axle casing, a platform connecting said springs at their centers, a universal joint supported by said platform, means carried by said universal joint to support the forward end of the vehicle chassis, said joint permitting universal movement between the chassis and the axle, a stay rod having divergent arms adjustably connected with opposite side elements of the vehicle chassis, a universal joint connecting the opposite end of said stay rod to said differential housing, and resilient elements interposed at both sides of the connecting means between said stay rod arms and chassis elements.

WILLIAM McCARTHY.
GEORGE WOLFF.